Nov. 26, 1940.     S. G. GREEN     2,222,613
COUPLING FOR FLEXIBLE SHAFTING
Filed May 27, 1938     2 Sheets-Sheet 1
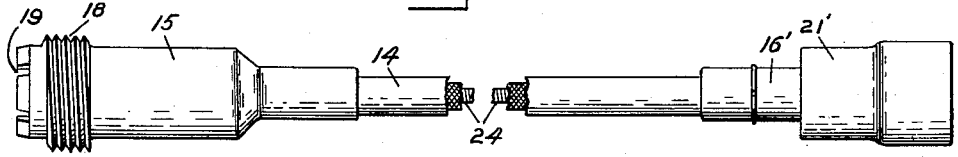
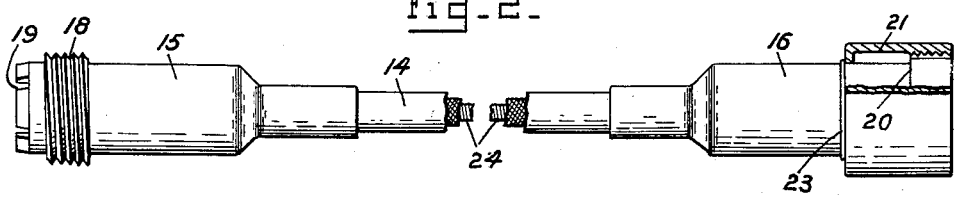
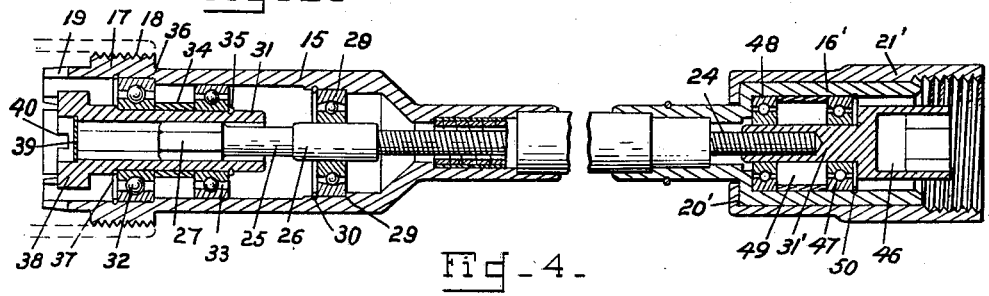
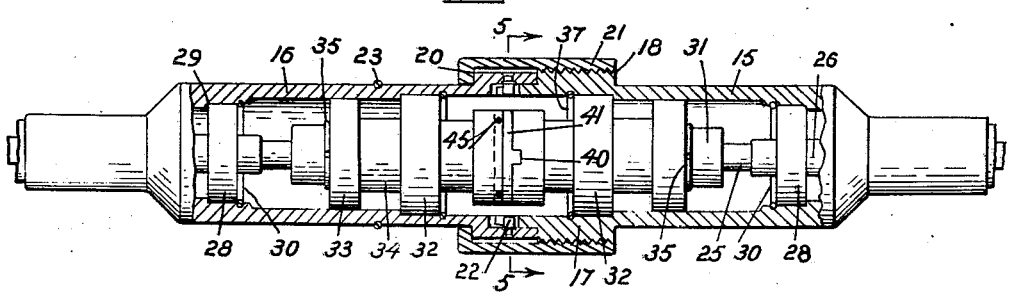
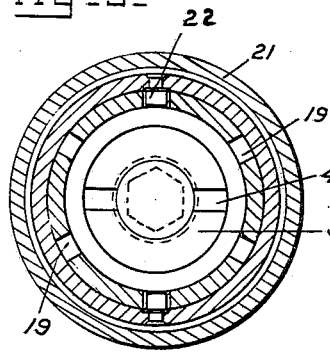
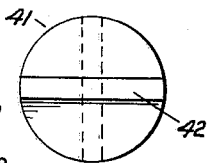
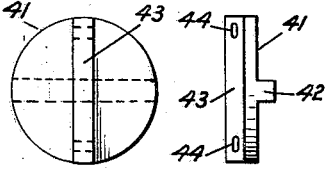
Inventor
Samuel G. Green
By G. J. Kessenich
Attorney Nov. 26, 1940.  S. G. GREEN  2,222,613
COUPLING FOR FLEXIBLE SHAFTING
Filed May 27, 1938  2 Sheets-Sheet 2
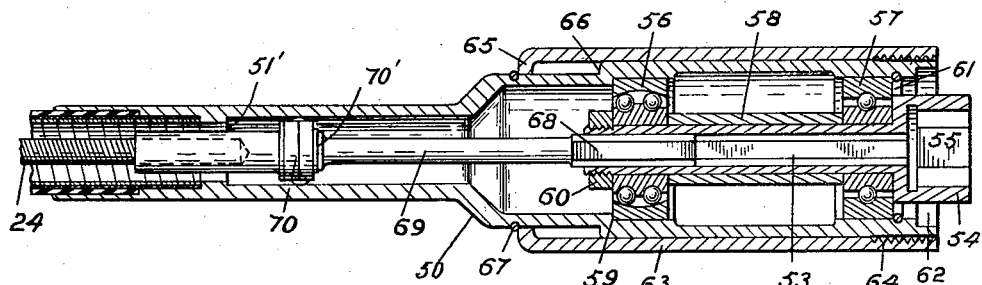
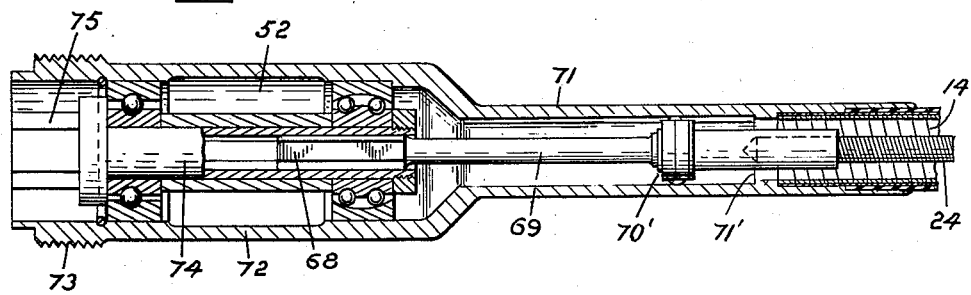
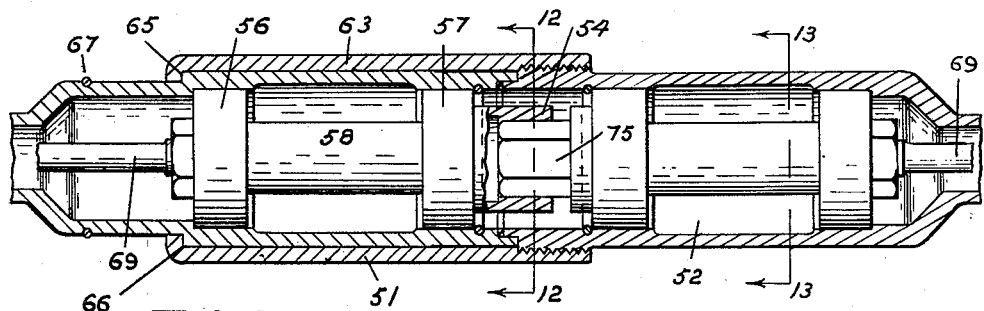
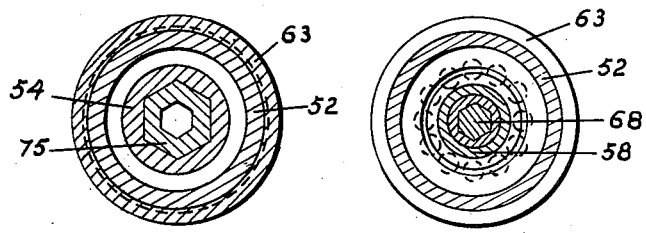
Inventor
Samuel G. Green
By *G. J. Kessenich*
Attorney Patented Nov. 26, 1940

2,222,613

UNITED STATES PATENT OFFICE 2,222,613

COUPLING FOR FLEXIBLE SHAFTING

Samuel G. Green, Gray, Ga.

Application May 27, 1938, Serial No. 210,321

6 Claims. (Cl. 64—4)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a coupling for flexible shafting which is intended primarily for use with comparatively long sections of flexible shafting.

When flexible shafting is used as a drive shaft a certain amount of creep is had due to the tendency of the shaft to either wind or unwind. In short lengths of shafting this tendency does not present a serious problem but, when long lengths and especially a number of long lengths must be used, this stretching or contracting of the shaft becomes so serious as to render its use almost impossible.

In addition the outer flexible casing is subject to variations in its length, tending to shorten in use and also to be stretched during installation.

According to this invention the shafting is so constructed that the outer flexible casing and the inner flexible shaft are capable of independently undergoing variations in length. A novel coupling is provided whereby elongation and shortening of a section of flexible shaft is permitted within the section of the outer casing and independently of an adjoining section of flexible shaft, the coupling member of adjoining sections each having a longitudinally fixed relation to its outer casing.

Further objects of the invention are to provide an arrangement in which the coupling members and the flexible shaft are readily assembled and replaced, in which the shaft is reversible and capable of assembly and operation irrespective of the direction of its winding, and in which precision fits of mating parts may be avoided.

With the foregoing and other objects in view, the invention consists in the arrangement and combination of parts and in the details of construction hereinafter described and claimed, it being understood that changes in the precise embodiment of the invention herein disclosed may be made within the scope of what is claimed without departing from the spirit of the invention.

Practical embodiments of the invention are illustrated in the accompanying drawings, wherein:

Fig. 1 is a side elevation of a fragment of a short section of shaft intended for connection to the driven mechanism;

Fig. 2 is a similar view of a long section;

Fig. 3 is an enlarged longitudinal sectional view of the short shaft illustrated in Fig. 1;

Fig. 4 is a side elevation partly in section of the coupling for sections of shaft;

Fig. 5 is a section on the line 5—5 of Fig. 4;

Figs. 6 and 7 are elevations of opposite faces of an adjustable coupling element;

Fig. 8 is a side elevation of the same;

Fig. 9 is a longitudinal section of an alternate form of coupling at one end of a shaft;

Fig. 10 is a similar view of the coupling at the opposite end of the shaft;

Fig. 11 is a similar view of the members in coupled relation;

Fig. 12 is a section on the line 12—12 of Fig. 11; and

Fig. 13 is a section on the line 13—13 of Fig. 11.

Referring to the drawings by numerals of reference:

Upon opposite ends of the well known flexible casing 14 are secured in any usual manner the reduced portions of rigid tubular casings 15 and 16 respectively. The tubular casing 15 (see Figs. 2 and 4) is formed with an annular flanged portion 17 threaded as at 18 and the casing as its free end has diametrically opposite slots 19 formed therein. The casing 16 is enlarged at its free end to telescope over the slotted end of casing 15 and to provide an exterior shoulder 20 forming a stop for the flanged end of a sleeve 21 slidable on the casing and interiorly threaded to engage the threads 18. Opposed lugs 22 project inwardly from the telescopic portion of the casing 16 to enter the slots 19 (Fig. 5) and prevent the sections from turning with respect to each other. A stop for the sleeve 21 may be provided on the casing 16, the one herein shown consisting of a ring 23 encircling the casing 16 and seated in an annular groove formed therein.

Within the flexible casing 14 is a usual wound flexible shaft 24 to the ends of which are secured in any usual manner the rigid end member 25 one of which is shown in Fig. 3. The rigid end member 25 is preferably formed with an enlarged cylindrical portion 26 at its inner end and with a head 27 of angular cross section, herein shown as hexagonal.

Since the structures within the casings 15 and 16 are duplicates (Figs. 2 and 4), those within the casing 15 will be described.

A self aligning outer frictionless bearing 28 rests against an annular shoulder 29 in the casing and is conveniently held in position by a split ring 30 seated in an annular groove formed in the casing. The bearing 28 forms a support for the enlarged portion 26 of the end member 25. The head 27 of the end member 25 has a sliding fit in a tubular coupling member 31 the interior walls forming the bore having an angular formation complemental to the angular formation of the head 27.

The tubular coupling member 31 has assembled thereon an outer frictionless bearing 32 which rests against an annular shoulder formed on the member 31, and an inner frictionless bearing 33 spaced from the outer bearing by a spacing sleeve 34. The bearings and sleeve may be retained in assembled position on the tubular member 31 by any suitable means, that herein shown consisting of a split ring 35 seated in a groove formed in the member. The inner bearing 33 is of less diameter than the outer bearing 32 so as to pass the annular shoulder 36 formed in the casing 15 against which the outer bearing rests and against which it is held as by a split ring 37 seated in an annular groove formed in the casing. The outer end of the coupling member 31 is flanged as at 38 and counterbored to receive a disk 39 which closes the same against dust or other foreign matter and this end has a slot 40 formed diametrically thereof.

When two sections are joined as shown in Fig. 4, a disk 41 (Figs. 6 and 8) having a rib 42 formed diametrically on one face thereof and a rib 43 formed on the opposite face thereof and positioned at right angles to the rib 42 is interposed between the ends of the tubular members 31 with the ribs positioned in the slots 40. For ease of assembly, the disk 41 may be detachably secured to the end of one tubular member 31 in any preferred manner one method as herein shown consisting in providing slots 44—44 in one rib, such as 43 (Fig. 8) through which pins 45, located in holes drilled in the end of member 31 pass. This structure allows slight shifting of the members 31 with respect to each other to compensate for slight misalignment of the parts.

With the shorter length of shaft as shown in Figs. 1 and 3, one end of which is to be coupled to a driving or driven member, an end casing 16' is provided having a sleeve 21' the flanged end of which abuts against annular shoulder 20' formed by the enlarged portion of the casing, and the sleeve is interiorly threaded to engage threads on the driven member. A coupling member 31 is secured to the end of the flexible shaft 24 and is formed with an enlarged socketed head 46 adapted to receive a complemental member on the driving part or the part to be driven. Within the casing are anti-friction bearings 47 and 48 spaced apart by a sleeve 49 to form a bearing for the coupling member 31. The bearings 47 and 48 may be held in place in the casing in any usual manner as by the split ring 50 seated in an annular groove in the casing.

In the modified form shown in Figs. 9 to 13 inclusive, the rigid casings 51 and 52 at respective ends of the flexible outer casing are somewhat elongated and within the casing 51 is a coupling member 53 having an enlarged outer end 54 in which is formed a socket 55 of angular cross section. Assembled on the coupling member 53 are inner and outer frictionless bearings 56 and 57 respectively, the outer bearing abutting the annular shoulder formed by the enlarged outer end 54, while the inner bearing, which is preferably self adjusting, is spaced from the outer bearing by a sleeve 58 and rests against a shoulder 59 formed internally of the casing 51. The bearings may be held assembled on the coupling member 53 by a nut 60 threaded on the inner end of the member or by other suitable means. The whole assembly is held in place within the casing by a split ring 61 seated in an annular groove formed in the casing. The front end of the casing is counterbored at 62 to receive the end of the casing 52. A sleeve 63 is slidable on the casing 51 and interiorly threaded at 64, while its rear end is turned to provide an annular flange 65 which is adapated to engage the annular shoulder 66 and a split ring 67 seated in a groove in the casing limits the rearward movement of the sleeve.

The coupling member 53 is tubular the interior walls being preferably hexagonal in cross section and within this tubular member is received with a sliding fit the hexagonal head 68 of a rod 69 secured to the end of flexible shaft 24. An antifriction bearing, preferably a three point bearing 70 held against a shoulder by a split ring 70' is carried by the rod 69 and engages the interior wall of the reduced portion of the casing 51 which has a shoulder 51' forming a stop to limit the shaft assembly in its longitudinal movement.

The casing 52 at the other end of flexible casing 14 has a reduced portion 71 with a shoulder 71' for bearing 70 and is secured to the end of the flexible casing. It also has an enlarged portion 72 threaded at 73 to engage the threads 64 of the sleeve 63 on an adjoining section of shafting. The forward end of the casing is reduced in its exterior diameter to telescope into the end 62 of the casing 51.

Within the casing 51 is a coupling 74 similar to the coupling member 53 heretofore described with the exception that the outer end is formed with a hexagonal head 75 to enter the socket 55 of coupling member 53. The coupling member 74 slidably receives the hexagonal head 68 of a rod 69 secured on the flexible shaft 24.

The operation of the shafting is similar to that of the usual flexible shafting, with the addition that the connection between the coupling members and shaft ends is longitudinally slidable to take care of the elongation or contraction which may occur in a section of the shafting. This symmetrical shafting is reversible end to end so that a right hand wound shafting can be assembled in a left hand wound casing and vice versa.

I claim:

1. In a coupling for flexible shafting, a flexible casing, a rigid casing secured to the end of the flexible casing, a bearing insertable in the end casing, a coupling member insertable in the end casing and carrying therewith a bearing engaging the end casing, means insertable in the end casing and mounted therein for retaining the bearing carried by and insertable with the coupling member, a flexible shaft housed in the flexible casing and supported by the bearing first inserted in the end casing, said flexible shaft including a rigid end having a slidable and a driving connection with the coupling member.

2. In a coupling for flexible shafting, a flexible casing, a rigid casing secured to the end of the flexible casing, a coupling member insertable in the end casing and carrying therewith spaced bearings engaging the end casing, means insertable in the end casing and mounted therein for retaining the bearings carried by and insertable with the coupling member, a flexible shaft housed in the flexible casing, said flexible shaft including a rigid end having a slidable and a driving connection with the coupling member.

3. In a coupling for flexible shafting, a flexible casing, a rigid casing secured to the end of the flexible casing and having a part with a reduced bore and a part with an enlarged bore, a coupling member rotatably carried in the enlarged bore of the casing and longitudinally fixed therein, a flexible shaft housed in the flexible casing and including a rigid end extending through the reduced bore of the rigid casing and having a slidable and driving connection with the coupling member, a bearing on the rigid end of the flexible shaft and slidably engaging the reduced bore of the rigid casing, and means on the outer end of the coupling member for establishing a driving connection with a complemental member when assembled end to end.

4. In flexible shafting, a flexible casing, rigid casings secured to the respective ends of the flexible casing, a coupling member longitudinally fixed in each rigid casing and mounted for rotation therein, means on the outer end of each coupling member for establishing a driving connection with a complemental member when assembled end to end, a flexible shaft housed in the flexible casing, and rigid ends on the flexible shaft, each rigid end having a slidable and a driving connection with an adjoining coupling member.

5. In flexible shafting, a flexible casing, rigid casings secured to the respective ends of the flexible casing, a hollow coupling member longitudinally fixed in each rigid casing and mounted for rotation therein, the outer end of each coupling member being closed and having means for establishing a driving connection with a complemental member when assembled end to end, a flexible shaft housed in the flexible casing, and rigid ends on the flexible shaft, each rigid end having a slidable and a driving connection with an adjoining coupling member.

6. In a coupling for flexible shafting, a pair of shafting sections, each section including a flexible casing with a rigid end casing, a coupling member longitudinally fixed within each rigid casing and mounted for rotation therein, the coupling members having interengaging complemental ends forming a driving connection arranged to be assembled by an end to end assembly of the rigid casings, means for coupling the rigid end casings when brought together end to end to maintain the driving connection of the coupling members, a flexible shaft in each flexible casing having a slidable and driving connection with the coupling member in the corresponding end casing.

SAMUEL G. GREEN.